United States Patent
Zhou et al.

(10) Patent No.: US 12,093,300 B1
(45) Date of Patent: Sep. 17, 2024

(54) ENHANCING ACCURACY OF ENTITY MATCHING INFERENCE USING LARGE LANGUAGE MODELS

(71) Applicant: SAP SE, Walldorf (DE)

(72) Inventors: Yi Quan Zhou, Singapore (SG); Rajesh Vellore Arumugam, Singapore (SG); Raja Sekhar Juluri, Singapore (SG); Xingce Bao, Singapore (SG); Eshwin Sukhdeve, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/463,519

(22) Filed: Sep. 8, 2023

(51) Int. Cl.
- *G06F 7/00* (2006.01)
- *G06F 16/33* (2019.01)
- *G06F 16/332* (2019.01)
- *G06F 16/35* (2019.01)
- *G06F 40/174* (2020.01)
- *G06F 40/186* (2020.01)

(52) U.S. Cl.
CPC .......... *G06F 16/35* (2019.01); *G06F 16/3329* (2019.01); *G06F 16/3344* (2019.01); *G06F 40/174* (2020.01); *G06F 40/186* (2020.01)

(58) Field of Classification Search
CPC .. G06F 16/35; G06F 16/3329; G06F 16/3344; G06F 16/86; G06F 16/00; G06F 16/55; G06F 16/93; G06F 40/186; G06F 40/174; G06F 40/30; G06F 40/35; G06F 40/284; G06F 40/205

See application file for complete search history.

(56) References Cited

U.S. PATENT DOCUMENTS

| | | | |
|---|---|---|---|
| 2005/0262129 A1* | 11/2005 | Hacigumus | G06F 16/86 707/999.102 |
| 2006/0053366 A1* | 3/2006 | Abe | G06F 40/143 715/234 |
| 2018/0365589 A1* | 12/2018 | Lacoste | G06N 20/00 |
| 2022/0108073 A1* | 4/2022 | Menon | G06F 40/295 |

* cited by examiner

*Primary Examiner* — Mohammad A Sana
(74) *Attorney, Agent, or Firm* — Fish & Richardson P.C.

(57) ABSTRACT

Methods, systems, and computer-readable storage media for receiving a first document including structured data and unstructured data, providing a first sub-document and a second sub-document, the first sub-document including the structured data of the first document, the second sub-document including the unstructured data of the first document, generating a prompt using the second sub-document and a second document, inputting the prompt to a LLM, receiving a response from the LLM, providing a calibrated first document by merging the response into the first sub-document, and processing the calibrated first document and the second document using a ML model to provide a prediction, the prediction indicating a matching class between the first document and the second document.

20 Claims, 6 Drawing Sheets

ENHANCING ACCURACY OF ENTITY MATCHING INFERENCE USING LARGE LANGUAGE MODELS

BACKGROUND

Enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using machine learning (ML) systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statements to invoices, and bank statements to customer accounts.

SUMMARY

Implementations of the present disclosure are directed to an improved ML-based document matching system that overcomes deficiencies of traditional document matching systems. More particularly, and as described in further detail herein, the ML-based document matching system of the present disclosure leverages large language models (LLMs) to extract key information from unstructured tabular data in semi-structured data tables.

In some implementations, actions include receiving a first document including structured data and unstructured data, providing a first sub-document and a second sub-document, the first sub-document including the structured data of the first document, the second sub-document including the unstructured data of the first document, generating a prompt using the second sub-document and a second document, inputting the prompt to a LLM, receiving a response from the LLM, providing a calibrated first document by merging the response into the first sub-document, and processing the calibrated first document and the second document using a ML model to provide a prediction, the prediction indicating a matching class between the first document and the second document. Other implementations of this aspect include corresponding systems, apparatus, and computer programs, configured to perform the actions of the methods, encoded on computer storage devices.

These and other implementations can each optionally include one or more of the following features: generating a prompt includes populating a prompt template using data from each of the second sub-document and the second document; the prompt includes a few-shot prompt; the matching class includes one of a match, a multi-match, and no match; the unstructured data includes a string of characters; the ML model includes a generic line-item matching (GLIM) model; and actions further include automatically executing a task in a ML-based decision system in response to the prediction.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
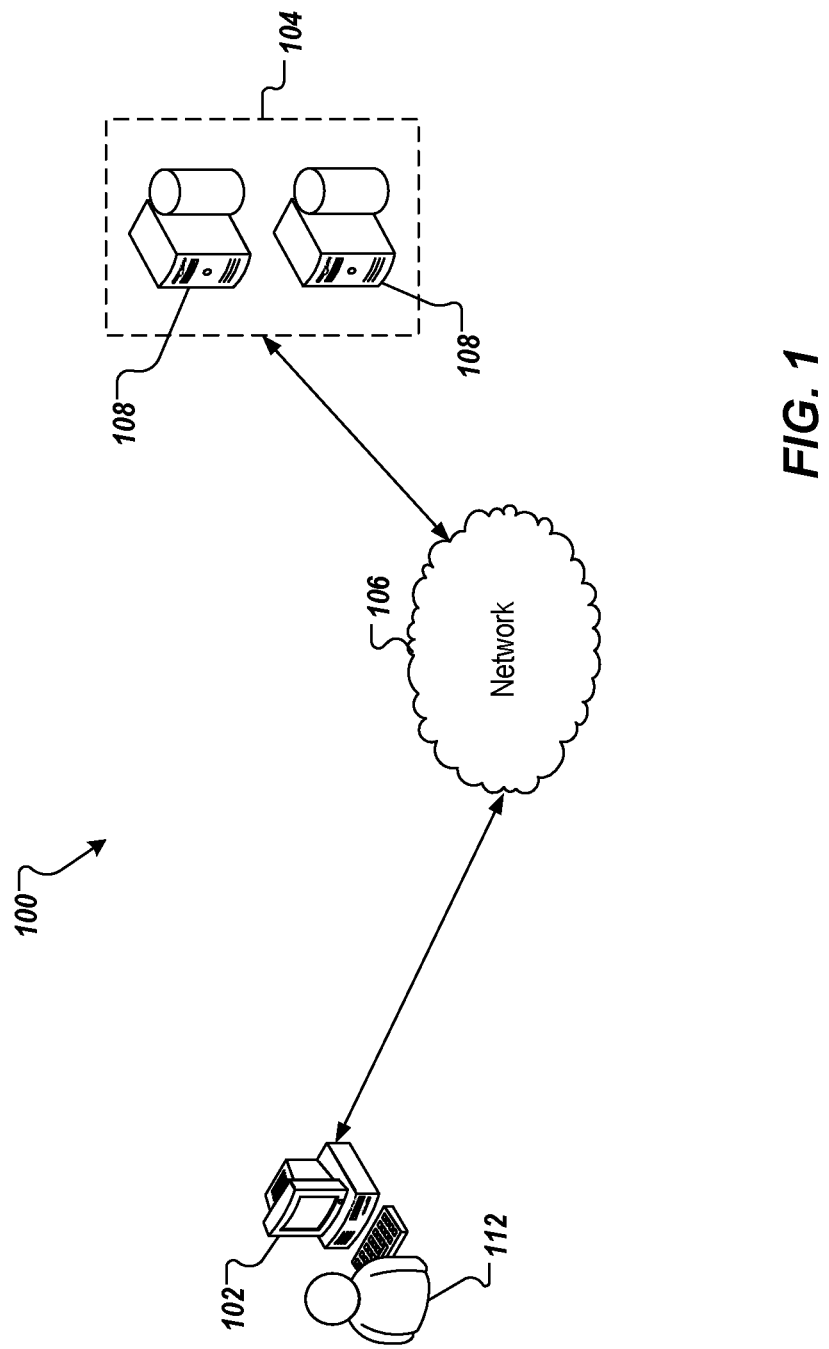
FIG. 1 depicts an example architecture that can be used to execute implementations of the present disclosure.

Implementations of the present disclosure are directed to an improved ML-based document matching system that overcomes deficiencies of traditional document matching systems. More particularly, and as described in further detail herein, the ML-based document matching system of the present disclosure leverages large language models (LLMs) to extract key information from unstructured tabular data in semi-structured data tables.

Implementations can include actions of receiving a first document including structured data and unstructured data, providing a first sub-document and a second sub-document, the first sub-document including the structured data of the first document, the second sub-document including the unstructured data of the first document, generating a prompt using the second sub-document and a second document, inputting the prompt to a LLM, receiving a response from the LLM, providing a calibrated first document by merging the response into the first sub-document, and processing the calibrated first document and the second document using a ML model to provide a prediction, the prediction indicating a matching class between the first document and the second document.

Implementations of the present disclosure are described in further detail herein with reference to an example problems space of matching entities represented by computer-readable records (electronic documents). It is contemplated, however, that implementations of the present disclosure can be realized in any appropriate problem space.

Matching entities represented by computer-readable records appears in many contexts. Example contexts can include matching product catalogs, deduplicating a materials database, and matching incoming payments from a bank statement table to open invoices. Implementations of the present disclosure are described in further detail with reference to an example use case within the example problem space, the example use case including the domain of finance and matching bank statements to invoices. More particularly, implementations of the present disclosure are described with reference to the problem of, given a bank statement (e.g., a computer-readable electronic document recording data representative of a bank statement), enabling an autonomous system using a ML model to determine one or more invoices (e.g., computer-readable electronic documents recording data representative of one or more invoices) that are represented in the bank statement. It is contemplated, however, that implementations of the present disclosure can be realized in any appropriate use case within the example problem space.

To provide context for implementations of the present disclosure, and as introduced above, enterprises continuously seek to improve and gain efficiencies in their operations. To this end, enterprises employ software systems to support execution of operations. Recently, enterprises have embarked on the journey of so-called intelligent enterprise, which includes automating tasks executed in support of enterprise operations using ML systems. For example, one or more ML models are each trained to perform some task based on training data. Trained ML models are deployed, each receiving input (e.g., a computer-readable document) and providing output (e.g., classification of the computer-readable document) in execution of a task (e.g., document classification task). ML systems can be used in a variety of problem spaces. An example problem space includes autonomous systems that are tasked with matching items of one entity to items of another entity. Examples include, without limitation, matching questions to answers, people to products, bank statement line items to invoices, and bank statement line items to customer accounts.

Technologies related to ML have been widely applied in various fields. For example, ML-based decision systems can be used to make decisions on subsequent tasks. With reference to the example use case, an ML-based decision system can be used to determine matches between bank statement line items and invoices. For example, invoices can be cleared in an accounting system by matching invoices to one or more line items in bank statements. In other contexts, decisions on treatment courses of patients (e.g., prescribe/not prescribe a drug) and/or decisions on whether to approve customers for loans can be made based on output of ML-based decision systems. In general, an output of a ML-based decision system can be referred to as a prediction or an inference result.

Line matching is the problem of matching line items from one data table to a single or a set of line items in another data table based on some inherent relationships. One example is matching bank statement line-items (e.g., payments received) to corresponding invoices (e.g., receivables). A ML-based document matching system can employ a generic line-item matching (GLIM) model to perform a matching task.

Such GLIM models are quite robust if data in each table field are clearly defined as structured data. However, and as frequently is the case, GLIM models suffer in performance when one or more data fields include unstructured data (e.g., text sentence data). Such tables are referred to as semi-structured data tables. Examples of such unstructured data include, but are not limited to remarks and memos. This degradation in performance results from an inability of GLIM models to accurately process the data based on context. This is compounded in cases where the training data used to train the GLIM model is not sufficient enough to cover every matching case in semi-structured data table scenarios. This degradation in performance results from incomprehensible string text and numbers. In enterprise systems, downstream tasks rely on the accuracy of GLIM model predictions (matching results) to, for example, guarantee automation of processes. For example, inaccuracies can result in an inability to automate downstream tasks and or incorrect execution of downstream tasks. In both scenarios, technical resources are expended to, for example, semi-automate the tasks and/or unwind incorrectly executed tasks.

In view of the above context, implementations of the present disclosure provide an improved ML-based document matching system that overcomes deficiencies of traditional document matching systems. More particularly, and as described in further detail herein, the ML-based document matching system of the present disclosure leverages LLMs to extract key information from unstructured tabular data in semi-structured data tables. In some implementations, ML-based document matching system generates a prompt to a LLM system based on the unstructured data, and uses a response returned by the LLM system to provide a calibrated first document. In the calibrated first document, the response provided from the LLM replaces the original unstructured data recorded in a first document. A GLIM model of the ML-based document matching system executes a matching task to generate a prediction based on the calibrated first document and the second document, the prediction indicating a type of match (e.g., single match, multi-match, no match).

Implementations of the present disclosure are described in further detail herein with reference to an example application that leverages one or more ML models to provide functionality (referred to herein as a ML application). The example application includes SAP Cash Application (CashApp) provided by SAP SE of Walldorf, Germany. CashApp leverages ML models that are trained using a ML framework (e.g., SAP AI Core) to learn accounting activities and to capture rich detail of customer and country-specific behavior.

An example accounting activity can include matching payments indicated in a bank statement to invoices for clearing of the invoices. For example, using an enterprise system (e.g., SAP S/4 HANA), incoming payment information (e.g., recorded in computer-readable bank statements) and open invoice information are passed to a matching engine, and, during inference, one or more ML models predict matches between line items of a bank statement and invoices. In some examples, matched invoices are either automatically cleared (auto-clearing) or suggested for review by a user (e.g., accounts receivable). Although CashApp is referred to herein for purposes of illustrating implementations of the present disclosure, it is contemplated that implementations of the present disclosure can be realized with any appropriate application that leverages one or more ML models.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a ML-based decision system that predicts matches between entities (e.g., CashApp, referenced by way of example herein). Also in accordance with implementations of the present disclosure, the ML-based decision system can include a ML-based document matching system that leverages a LLM to improve overall performance. More particularly, and as described in further detail herein, the ML-based document matching system of the present disclosure extracts relevant, key information from unstructured data recorded in semi-structured data tables. A few-shot prompting approach for the LLM is utilized and is integrated with a deep learning model (e.g., the GLIM model). Here, providing context in a few-shot prompt can be referred to as few-shot learning. In natural language processing (NLP), few-shot learning (also referred to as in-context learning and/or few-shot prompting) is a prompting technique that enables a LLM to process examples before attempting a task. In the context of the present disclosure, the task includes line-item matching.

In further detail, the unstructured data (e.g., memo) is extracted from the semi-structured data table, a first document (e.g., a bank statement line item), and is used as context, provided as few-shot example, for a prompt to the LLM. In some examples, names of data fields of a second document (e.g., invoice) are abstracted and are also used to construct the prompt. In some examples, and as described in further detail herein, a prompt template is used to build iterative few-shot examples for the prompt. The prompt is sent as a query to a LLM system that executes a LLM. The LLM processes the prompt to predict relevant information from the unstructured data. The response from the LLM is merged with the structured data of the first document to provide a calibrated first document. The calibrated first document and the second document are input to the deep learning matching model (e.g., GLIM model), which executes a matching task.

Figure 2:
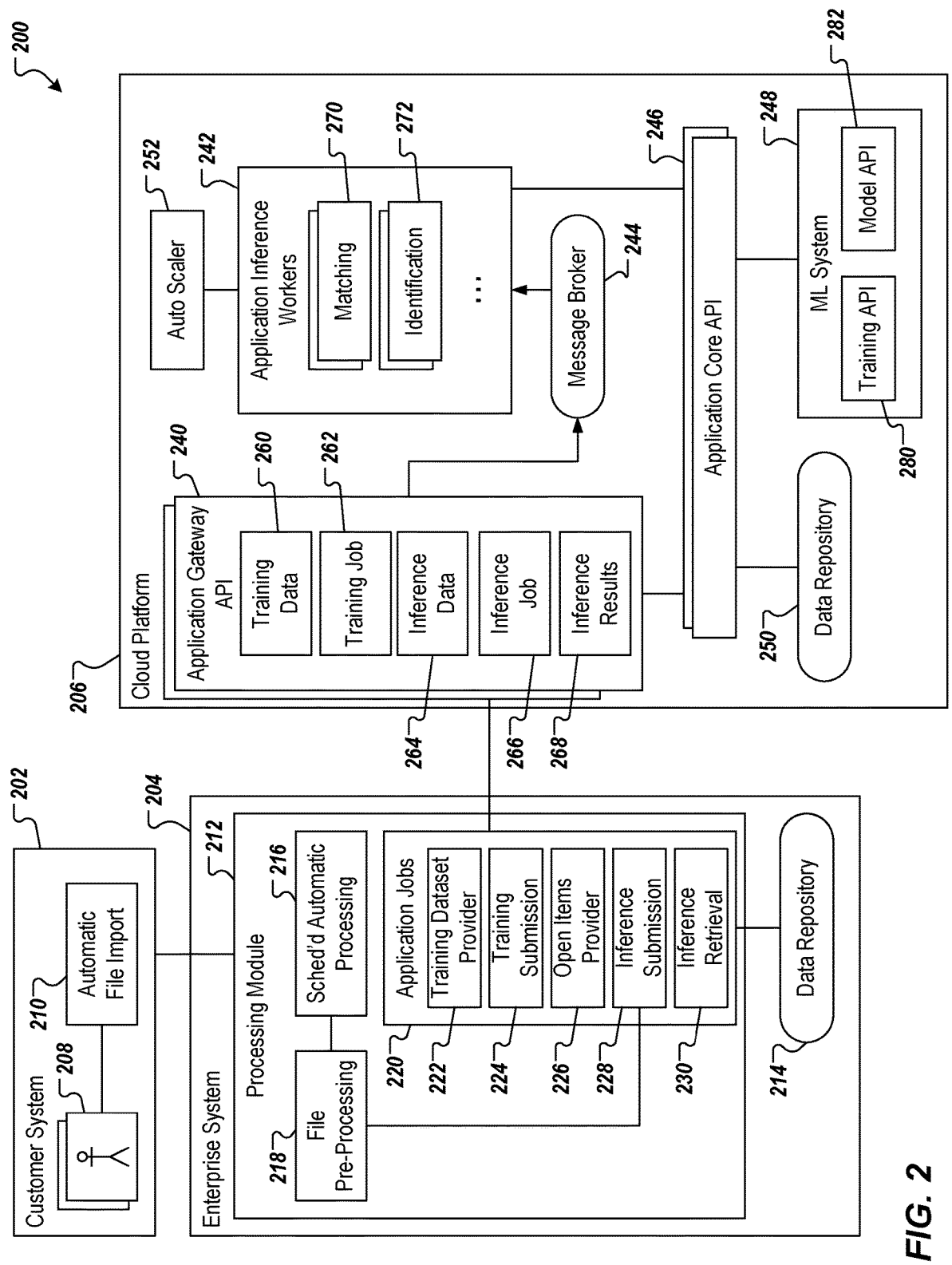
FIG. 2 depicts an example conceptual architecture in accordance with implementations of the present disclosure.

FIG. 2 depicts an example conceptual architecture 200 in accordance with implementations of the present disclosure. In the depicted example, the conceptual architecture 200 includes a customer system 202, an enterprise system 204 (e.g., SAP S/4 HANA) and a cloud platform 206 (e.g., SAP Cloud Platform (Cloud Foundry)). As described in further detail herein, the enterprise system 204 and the cloud platform 206 facilitate one or more ML applications that leverage ML models to provide functionality for one or more enterprises. In some examples, each enterprise interacts with the ML application(s) through a respective customer system 202. For purposes of illustration, and without limitation, the conceptual architecture 200 is discussed in further detail with reference to CashApp, introduced above. However, implementations of the present disclosure can be realized with any appropriate ML application.

In the example of FIG. 2, the customer system 202 includes one or more client devices 208 and a file import module 210. In some examples, a user (e.g., an employee of the customer) interacts with a client device 208 to import one or more data files to the enterprise system 204 for processing by a ML application. For example, and in the context of CashApp, an invoice data file and a bank statement data file can be imported to the enterprise system 204 from the customer system 202. In some examples, the invoice data file includes data representative of one or more invoices issued by the customer, and the bank statement data file includes data representative of one or more payments received by the customer. As another example, the one or more data files can include training data files that provide customer-specific training data for training of one or more ML models for the customer.

In the example of FIG. 2, the enterprise system 204 includes a processing module 212 and a data repository 214. In the context of CashApp, the processing module 212 can include a finance—accounts receivable module. The processing module 212 includes a scheduled automatic processing module 216, a file pre-processing module 218, and an applications job module 220. In some examples, the scheduled automatic processing module 216 receives data files from the customer system 202 and schedules the data files for processing in one or more application jobs. The data files are pre-processed by the file pre-processing module 218 for consumption by the processing module 212.

Example application jobs can include, without limitation, training jobs and inference jobs. In some examples, a training job includes training of a ML model using a training file (e.g., that records customer-specific training data). In some examples, an inference job includes using a ML model to provide a prediction, also referred to herein as an inference result. In the context of CashApp, the training data can include invoice to bank statement line item matches as examples provided by a customer, which training data is used to train a ML model to predict invoice to bank statement matches. Also in the context of CashApp, the data files can include an invoice data file and a bank statement data file that are ingested by a ML model to predict matches between invoices and bank statements in an inference process.

With continued reference to FIG. 2, the application jobs module 220 includes a training dataset provider sub-module 222, a training submission sub-module 224, an open items provider sub-module 226, an inference submission sub-module 228, and an inference retrieval sub-module 230. In some examples, for a training job, the training dataset provider sub-module 222 and the training submission sub-module 224 function to request a training job from and provide training data to the cloud platform 206. In some examples, for an inference job, the training dataset provider sub-module 222 and the training submission sub-module 224 function to request a training job from and provide training data to the cloud platform 206.

In some implementations, the cloud platform 206 hosts at least a portion of the ML application (e.g., CashApp) to execute one or more jobs (e.g., training job, inference job). In the example of FIG. 2, the cloud platform 206 includes one or more application gateway application programming interfaces (APIs) 240, application inference workers 242 (e.g., matching worker 270, identification worker 272), a message broker 244, one or more application core APIs 246, a ML system 248, a data repository 250, and an auto-scaler 252. In some examples, the application gateway API 240 receives job requests from and provides job results to the enterprise system 204 (e.g., over a REST/HTTP [oAuth] connection). For example, the application gateway API 240 can receive training data 260 for a training job 262 that is executed by the ML system 248. As another example, the application gateway API 240 can receive inference data 264 (e.g., invoice data, bank statement data) for an inference job 266 that is executed by the application inference workers 242, which provide inference results 268 (e.g., predictions).

In some examples, the enterprise system 204 can request the training job 262 to train one or more ML models using the training data 260. In response, the application gateway API 240 sends a training request to the ML system 248 through the application core API 246. By way of non-limiting example, the ML system 248 can be provided as SAP AI Core. In the depicted example, the ML system 248 includes a training API 280 and a model API 282. The ML system 248 trains a ML model using the training data. In some examples, the ML model is accessible for inference jobs through the model API 282.

In some examples, the enterprise system 204 can request the inference job 266 to provide the inference results 268, which includes a set of predictions from one or more ML models. In some examples, the application gateway API 240 sends an inference request, including the inference data 264, to the application inference workers 242 through the message broker 244. An appropriate inference worker of the application inference workers 242 handles the inference request. In the example context of matching invoices to bank statements, the matching worker 270 transmits an inference request to the ML system 248 through the application core API 246. The ML system 248 accesses the appropriate ML model (e.g., the ML model that is specific to the customer and that is used for matching invoices to bank statements), which generates the set of predictions. The set of predictions are provided back to the inference worker (e.g., the matching worker 270) and are provided back to the enterprise system 204 through the application gateway API 240 as the inference results 266. In some examples, the auto-scaler 252 functions to scale the inference workers up/down depending on the number of inference jobs submitted to the cloud platform 206.

Figure 3:
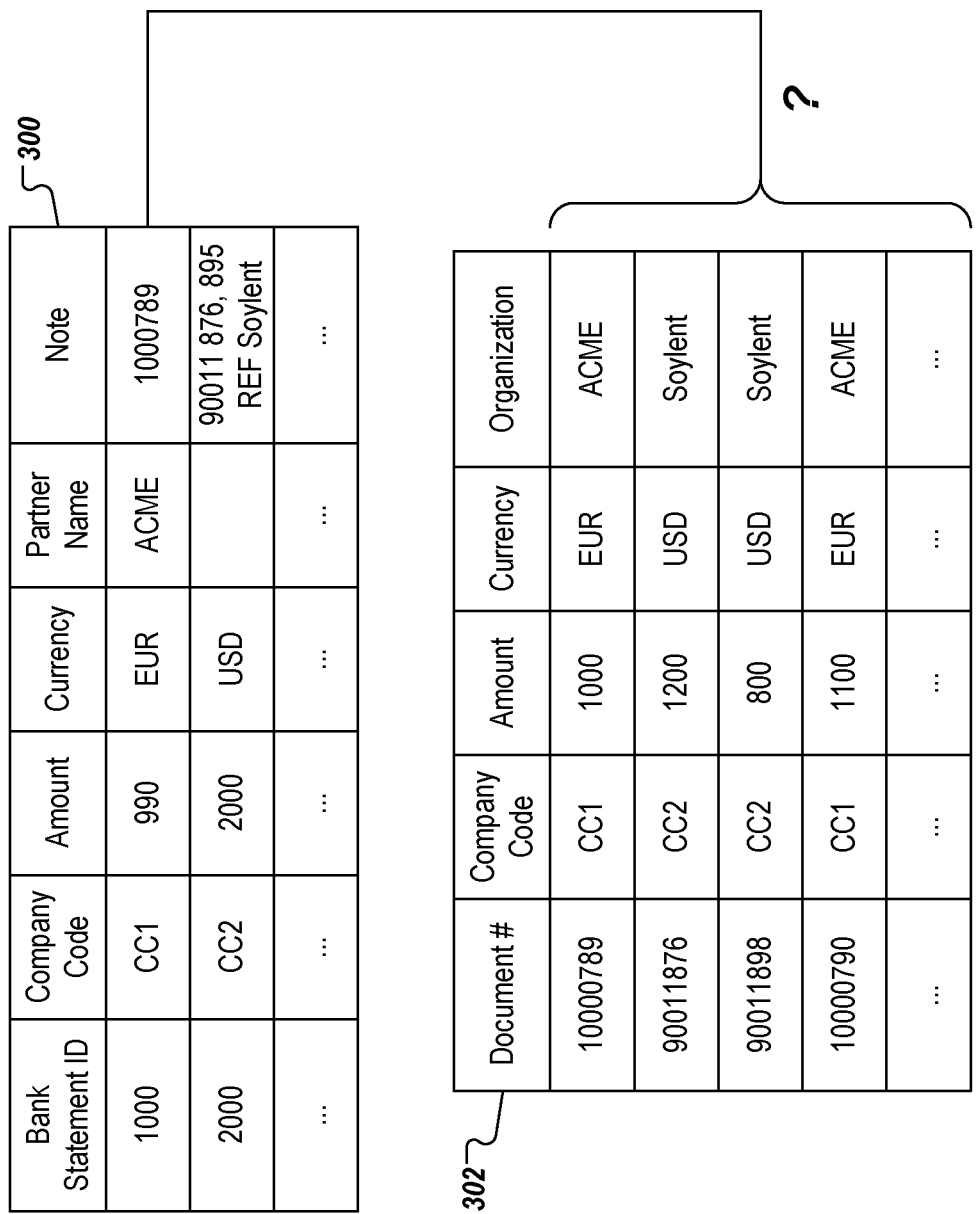
FIG. 3 depicts portions of example electronic documents.

In the example context, FIG. 3 depicts portions of example electronic documents. In the example of FIG. 3, a first electronic document 300 includes a bank statement table that includes records representing payments received, and a second electronic document 302 includes an invoice table that includes invoice records respectively representing invoices that had been issued. In the example context, each bank statement record is to be matched to one or more invoice records. Accordingly, the first electronic document 300 and the second electronic document 302 are processed using one or more ML models that provide predictions regarding matches between a bank statement record (entity) and one or more invoice records (entity/-ies) (e.g., using CashApp, as described above).

To achieve this, a ML model (matching model) is provided as a classifier that is trained to predict entity pairs to a fixed set of class labels ($\vec{l}$) (e.g., $l_0$, $l_1$, $l_2$). For example, the set of class labels ($\vec{l}$) can include 'no match' ($l_0$), 'single match' ($l_1$), and 'multi match' ($l_2$). In some examples, the ML model is provided as a function $f$ that maps a query entity ($\vec{a}$) and a target entity ($\vec{b}$) into a vector of probabilities ($\vec{p}$) (also called 'confidences' in the deep learning context) for the labels in the set of class labels. This can be represented as:

$$f(\vec{a}, \vec{b}) = \begin{pmatrix} p_0 \\ p_1 \\ p_2 \end{pmatrix}$$

where $\vec{p} = \{p_0, p_1, p_2\}$. In some examples, $p_0$ is a prediction probability (also referred to herein as confidence c) of the item pair $\vec{a}$, $\vec{b}$ belonging to a first class (e.g., no match), $p_1$ is a prediction probability of the item pair $\vec{a}$, $\vec{b}$ belonging to a second class (e.g., single match), and $p_2$ is a prediction probability of the item pair $\vec{a}$, $\vec{b}$ belonging to a third class (e.g., multi match).

Here, $p_0$, $p_1$, and $p_2$ can be provided as numerical values indicating a likelihood (confidence) that the item pair $\vec{a}$, $\vec{b}$ belongs to a respective class. In some examples, the ML model can assign a class to the item pair a, b based on the values of $p_0$, $p_1$, and $p_2$. In some examples, the ML model can assign the class corresponding to the highest value of $p_0$, $p_1$, and $p_2$. For example, for an entity pair a, b, the ML model can provide that $p_0=0.13$, $p_1=0.98$, and $p_2=0.07$. Consequently, the ML model can assign the class 'single match' ($l_1$) to the item pair $\vec{a}$, $\vec{b}$.

Figure 4:
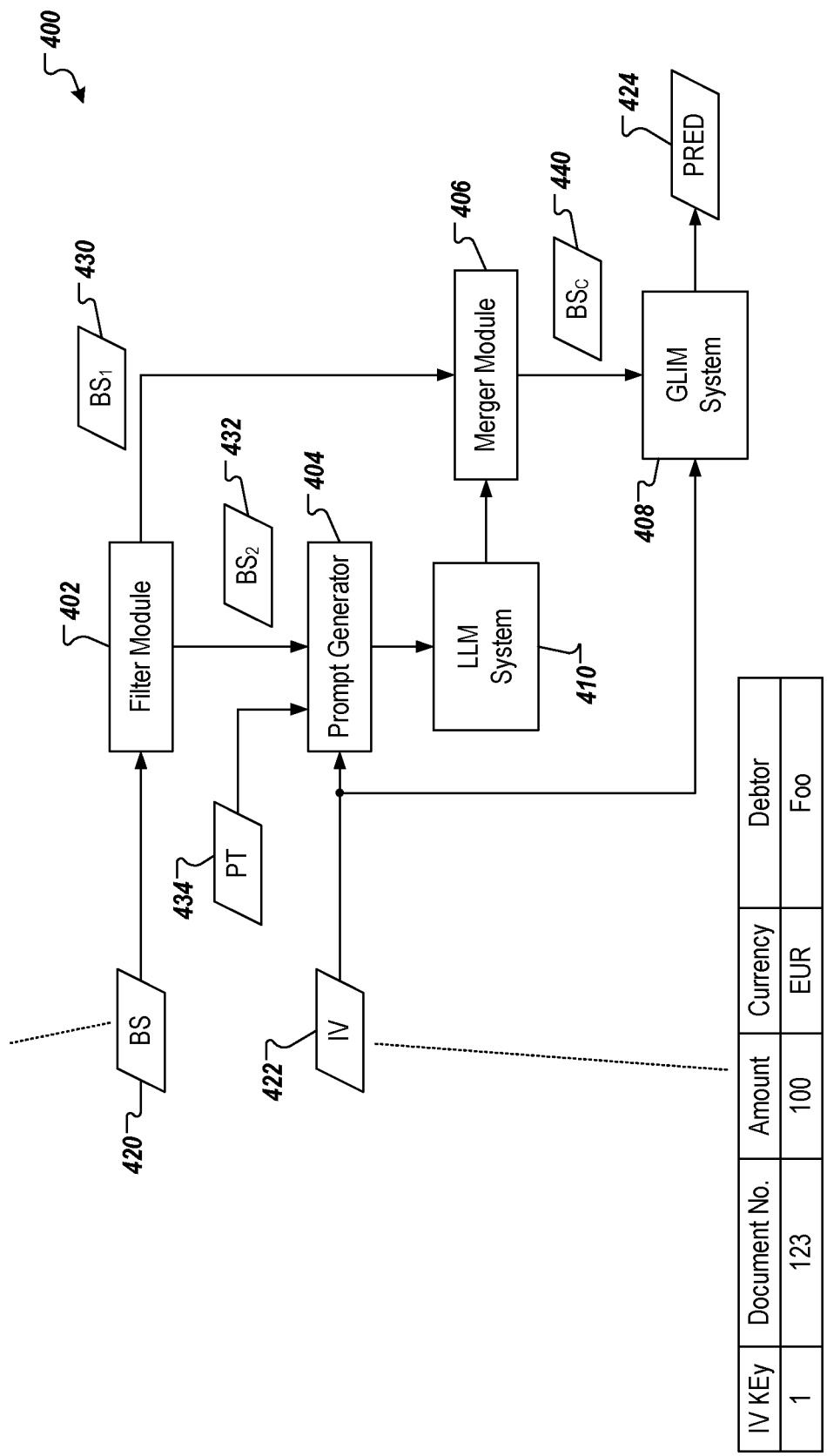
FIG. 4 depicts an example conceptual architecture in accordance with implementations of the present disclosure.

FIG. 4 depicts an example conceptual architecture 400 in accordance with implementations of the present disclosure. In the example of FIG. 4, the conceptual architecture 400 includes a filter module 402, a prompt generator 404, a merger module 406, a GLIM system 408, and a LLM system 410. As described in further detail herein, a first document 420 (e.g., a bank statement (BS)) and a second document 422 (e.g., an invoice (I)) are processed through the conceptual architecture 400 to provide a prediction (PRED) 424.

In further detail, the filter module 402 processes the first document 420 to generate a first sub-document 430 and a second sub-document 432. In some examples, the first sub-document 430 includes a first portion of the content of the first document 420 and the second sub-document 432 includes a second portion of the content of the first document 420. The first portion includes the unstructured data from the unstructured data field(s) and the second portion includes the structured data from the structured data fields. For example, and with reference to the example context, the first document 420 can include a bank statement (e.g., a line item of a bank statement), the first sub-document 430 can include the memo portion (unstructured data) of the bank statement, and the second sub-document 432 can include the remaining portion(s) (structured date) of the bank statement (e.g., key, partner name, amount, country code).

The prompt generator 404 receives the invoice 422, the second sub-document 432, and a prompt template (PT) 434, and processes each to provide a prompt. In further detail, to ensure that the LLM of the LLM system 410 produces an accurate response from the unstructured data, the prompt used to query the LLM includes one or more few-shot examples that indicate context to the LLM. In some implementations, names of data fields of the second document 422 (e.g., IV key, Doc Number, Amount, etc.) are abstracted. These names of data field names provide context for the LLM to evaluate what in the unstructured data of the first document 420 is relevant for the data fields in the second document 422. A few-shot prompt query is built on each data field name to ensure the accuracy of the prompt for the relevant data of this field from the unstructured data (e.g., memo of bank statement table).

In further detail, each data field can be considered a header of the data table and can be abstracted by reading the content of data table file and reding the first row of content. For example, Listing 1, below, is an example prompt template, in which {field_names_invoices} can be replaced with actual abstracted data fields (e.g., ["IV Key," "Document No.," "Amount," etc.]). By populating the prompt template, a few-shot prompt is provided. In some examples, the prompt template is generic. In this manner, the few-shot prompt can be automatically generated. This enables at least a portion of the matching process to be automated.

Listing 1: Example Prompt Template

```
context = {f"""
In the data content of table 1 and table 2: {table1}
and {table2}
user_prompt = f"""
In below memo: {memoline} \n
identify any properties matched in array:
{field_names_invoices}, output the values of the
matched properties in JSON format.
"""
prompt = [{"role": "system", "content": context,
{"role": "user", "content": user_prompt}]
response = get completion (prompt)
```

Continuing, the merger module 406 receives the first sub-document 430 and the response from the LLM system 410 and mergers each to provide the calibrated first document 440. An example response from the LLM system 410 can be provided as:

```
[
  {
    "Document No.": 123
  },
  {
    "Amount": 100
  },
  ......
]
```

This array is be parsed and each item is mapped to a line in the original table. The data field (property) is appended as a new column in table and the value is added under the column for the corresponding line. In some examples, because the LLM is unable to accurately generate data in a table structure, the response is provided in a programmatically-efficient format, such as Javascript object notation (JSON), and the data provided therein is applied to the table structure in a data table file, as described herein.

In accordance with implementations of the present disclosure, merging reduces distraction or negative impact of unstructured data in the matching task executed by the GLIM system 408. In this way, the GLIM model does not need to include and process unstructured data which can introduce distraction parameters. Because, in the prompting process, the unstructured data was processed comprehensively according to second document, it ensures comprehensive abstraction of relevant information comprehensively. Therefore, the merged data table (i.e., the calibrated first document) fed for deep learning matching model are sound with better quality to produce better accuracy.

Figure 5:
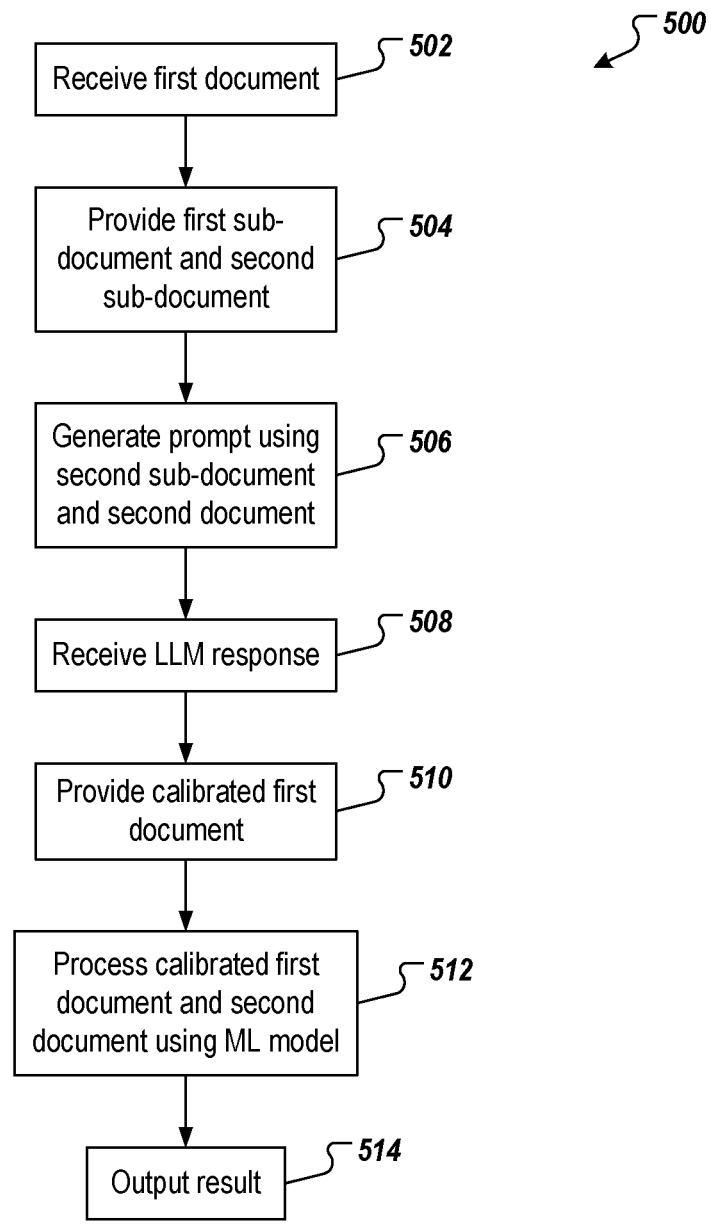
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A first document is received (502). For example, and as described in further detail herein, the filter module 402 of FIG. 4 receives the first document 420. In some examples, the first document is provided as a query document that is to be matched to a target document. In the example use case, the first document is provided as a bank statement (e.g., a line-item of a bank statement). A first sub-document and a second sub-document are provided (504). For example, and as described in further detail herein, the filter module 402 filters the unstructured data from the first document 420 to provide the first sub-document 430 and the second sub-document 432. The first sub-document includes the structured data of the first document and the second sub-document includes the unstructured data of the first document.

A prompt is generated using the second sub-document and a second document (506). For example, and as described in further detail herein, the prompt generator 404 generates the prompt as a few-shot prompt using data of the second sub-document 432 and the second document 422. In some examples, the second document is provided as a target document that is to be matched to a query document. In the example use case, the second document is provided as an invoice.

A LLM response is received (508). For example, and as described in further detail herein, the prompt is provided as input to the LLM system 410, which process the prompt through a LLM and generates a response. A calibrated first document is provided (510). For example, and as described in further detail herein, the merger module 406 receives the response from the LLM system 410 and the first sub-document 430 and merges the response into the first sub-document 430 to provide the calibrated first document 440. The calibrated first document and the second document are processed through a ML model to perform a ML task (512). For example, and as described in further detail herein, the calibrated first document 440 and the second document 422 are input to the GLIM system 408 for processing through a GLIM model for a matching task. A result is output (514). For example, and as described in further detail herein, the GLIM system 408 provides the prediction 424 as output. The prediction 424 indicates a matching class between the first document 420 and the second document 422. That is, while the prediction is based on the calibrated first document and the second document, the prediction is imparted to a match between the first document and the second document. In some examples, one or more tasks can be automatically executed in a ML-based decision system in response to the prediction. For example, and in the example use case, an invoice can be automatically cleared in a computer-implemented accounting system in response to the prediction.

Implementations of the present disclosure provide multiple technical improvements. For example, implementations of the present disclosure improve over traditional ML-based decision systems by improving the accuracy of processing semi-structured data through a deep learning matching model (e.g., GLIM model). In traditional approaches, when unstructured data fields are used for matching prediction, irrelevant contextual meaning can be introduced through the unstructured data. This leads to the matching model giving a closer relationship predication, but which may be not actually be related in context of the unstructured data. By way of non-limiting example, a memo of a bank statement mentions a customer reference "FC000ABC400" and an invoice having a reference code of "FC000ABC4000" can be considered. The matching model may take the bank statement with memo containing "FC000ABC400" as closer relationship to invoice with reference as "FC000ABC4000".

As another example, auto-generation of prompting is able to adapt for all scenarios of target data tables (e.g., invoice tables). The data field names of target data tables are abstracted and used for generating prompt. This ensures that the prompt is precise to query the LLM for unstructured data (e.g., memo) within a context scope of data set in target data table. Because this generation is programmatically embedded in the data processing, implementations of the present disclosure can be used for any other data table scenarios. In this manner, retraining of ML models for specific scenarios is avoided, which conserves technical resources that would otherwise be expended.

As another example, by leveraging a LLM, multi-language processing of unstructured data is supported. More particularly, deep learning matching models cannot process text data, for example, in language context. By leveraging the LLM, the relevant data information can be retrieved according to language context. This avoids re-training of the deep learning model and/or having multiple deep learning models to support different languages. This conserves technical resources that would otherwise be expended.

Figure 6:
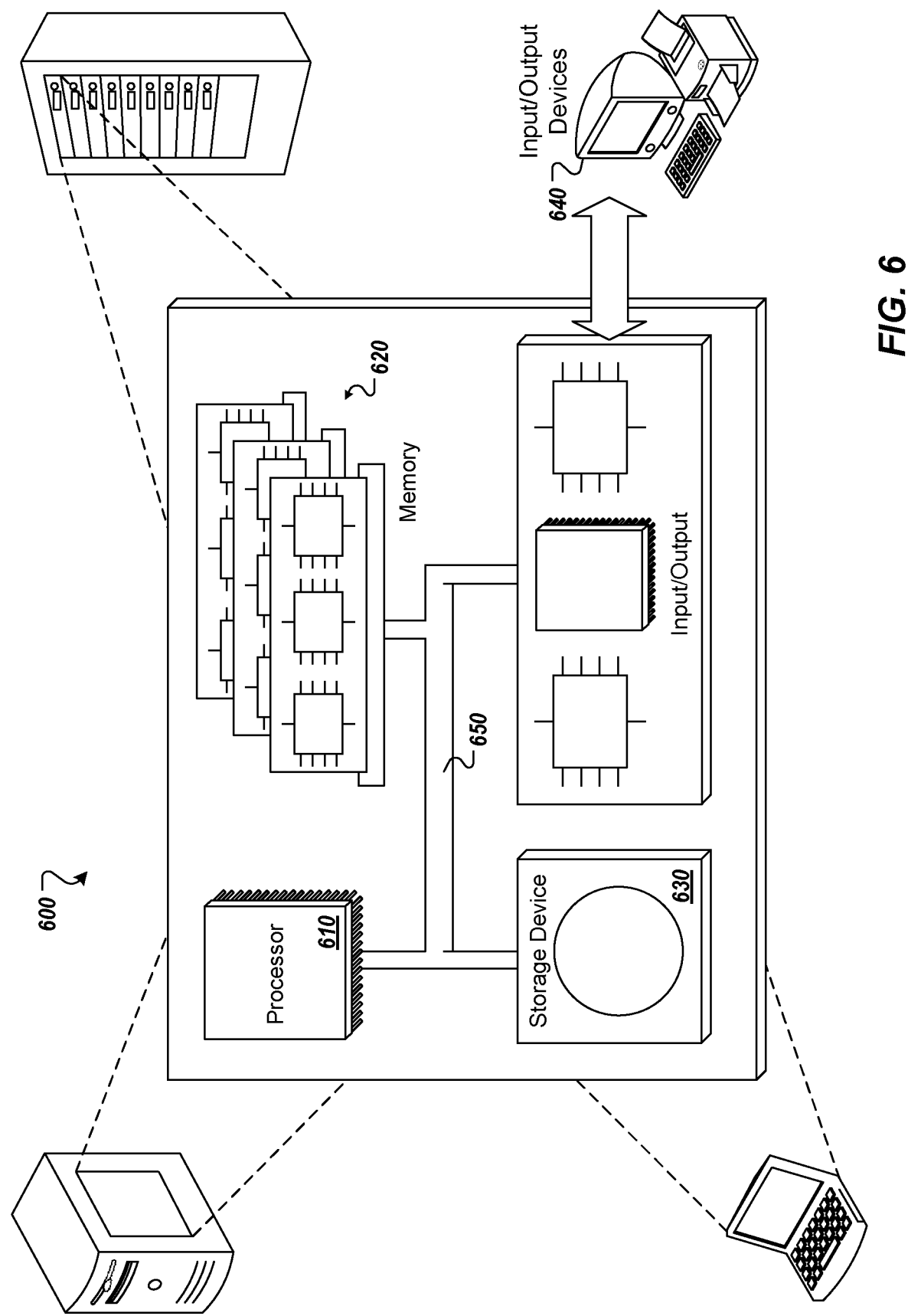
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for improved document matching using machine learning (ML) models in ML-based decision systems, the method being executed by one or more processors and comprising:
   receiving a first document comprising structured data and unstructured data;
   providing a first sub-document and a second sub-document, the first sub-document comprising the structured data of the first document, the second sub-document comprising the unstructured data of the first document;
   generating a prompt using the second sub-document and a second document;
   inputting the prompt to a large language model (LLM);
   receiving a response from the LLM;
   providing a calibrated first document by merging the response into the first sub-document; and
   processing the calibrated first document and the second document using a ML model to provide a prediction, the prediction indicating a matching class between the first document and the second document.

2. The method of claim 1, wherein generating a prompt comprises populating a prompt template using data from each of the second sub-document and the second document.

3. The method of claim 1, wherein the prompt comprises a few-shot prompt.

4. The method of claim 1, wherein the matching class comprises one of a match, a multi-match, and no match.

5. The method of claim 1, wherein the unstructured data comprises a string of characters.

6. The method of claim 1, wherein the ML model comprises a generic line-item matching (GLIM) model.

7. The method of claim 1, further comprising automatically executing a task in a ML-based decision system in response to the prediction.

8. A non-transitory computer-readable storage medium coupled to one or more processors and having instructions stored thereon which, when executed by the one or more processors, cause the one or more processors to perform operations for improved document matching using machine learning (ML) models in ML-based decision systems, the operations comprising:
   receiving a first document comprising structured data and unstructured data;
   providing a first sub-document and a second sub-document, the first sub-document comprising the structured data of the first document, the second sub-document comprising the unstructured data of the first document;
   generating a prompt using the second sub-document and a second document;
   inputting the prompt to a large language model (LLM);
   receiving a response from the LLM;
   providing a calibrated first document by merging the response into the first sub-document; and
   processing the calibrated first document and the second document using a ML model to provide a prediction, the prediction indicating a matching class between the first document and the second document.

9. The non-transitory computer-readable storage medium of claim 8, wherein generating a prompt comprises populating a prompt template using data from each of the second sub-document and the second document.

10. The non-transitory computer-readable storage medium of claim 8, wherein the prompt comprises a few-shot prompt.

11. The non-transitory computer-readable storage medium of claim 8, wherein the matching class comprises one of a match, a multi-match, and no match.

12. The non-transitory computer-readable storage medium of claim 8, wherein the unstructured data comprises a string of characters.

13. The non-transitory computer-readable storage medium of claim 8, wherein the ML model comprises a generic line-item matching (GLIM) model.

14. The non-transitory computer-readable storage medium of claim 8, wherein operations further comprise automatically executing a task in a ML-based decision system in response to the prediction.

15. A system, comprising:
   a computing device; and
   a computer-readable storage device coupled to the computing device and having instructions stored thereon which, when executed by the computing device, cause the computing device to perform operations for improved document matching using machine learning (ML) models in ML-based decision systems, the operations comprising:
      receiving a first document comprising structured data and unstructured data;
      providing a first sub-document and a second sub-document, the first sub-document comprising the structured data of the first document, the second sub-document comprising the unstructured data of the first document;
      generating a prompt using the second sub-document and a second document;
      inputting the prompt to a large language model (LLM);
      receiving a response from the LLM;
      providing a calibrated first document by merging the response into the first sub-document; and
      processing the calibrated first document and the second document using a ML model to provide a prediction, the prediction indicating a matching class between the first document and the second document.

16. The system of claim 15, wherein generating a prompt comprises populating a prompt template using data from each of the second sub-document and the second document.

17. The system of claim 15, wherein the prompt comprises a few-shot prompt.

18. The system of claim 15, wherein the matching class comprises one of a match, a multi-match, and no match.

19. The system of claim 15, wherein the unstructured data comprises a string of characters.

20. The system of claim 15, wherein the ML model comprises a generic line-item matching (GLIM) model.

* * * * *